United States Patent [19]
Papineni et al.

[11] Patent Number: 5,991,710
[45] Date of Patent: Nov. 23, 1999

[54] STATISTICAL TRANSLATION SYSTEM WITH FEATURES BASED ON PHRASES OR GROUPS OF WORDS

[75] Inventors: Kishore Ananda Papineni, Ossining; Salim Estephan Roukos, Scarsdale; Robert Todd Ward, Croton-on-Hudson, all of N.Y.

[73] Assignee: International Business Machines Corporation, Armonk, N.Y.

[21] Appl. No.: 08/859,586

[22] Filed: May 20, 1997

[51] Int. Cl.$^6$ .................................................. G06F 17/28
[52] U.S. Cl. ...................................................... 704/2; 704/9
[58] Field of Search ........................................ 704/2–7, 9

[56] References Cited

U.S. PATENT DOCUMENTS

| | | | |
|---|---|---|---|
| 4,773,039 | 9/1988 | Zamora | 364/900 |
| 5,237,502 | 8/1993 | White et al. | 364/419.01 |
| 5,293,584 | 3/1994 | Brown et al. | 395/2.86 |
| 5,424,947 | 6/1995 | Nagao et al. | 364/419.08 |
| 5,477,451 | 12/1995 | Brown et al. | 364/419.08 |
| 5,510,981 | 4/1996 | Berger et al. | 364/419.02 |
| 5,568,383 | 10/1996 | Johnson et al. | 364/419.02 |

OTHER PUBLICATIONS

A Maximum Entropy Approach to Natural Language Processing, Berger et al., Association for Computation Linguistics, pp. 39–71, vol. 22, No. 1, Mar. 1996.

A Maximum Entropy Model for Parsing, Ratnaparkhi et al., Proceedings of International Conference on Spoken Language Processing, Yokohama, Japan, pp. 803–806, vol. 2, 1994.

Decision Tree Models Applied to the Labeling of Text with Parts–of–Speech, Black et al., Proceedings of Speech and Natural Language Workshop, pp. 117–121, New York, Feb. 1992.

Decision Tree Parsing Using a Hidden Derivative Model, Jelinek et al., Proceedings of Human Language Technologies Workshop, Plainsboro, N.J., pp. 272–277, Mar. 8–11, 1994.

Part of Speech Assignment By a Statistical Decision Algorithm, Bahl et al., IEEE International Symposium on Information Theory, pp. 88–89, Ronneby, Sweden (1976).

Recent Progress in Hidden Understanding Models, Miller et al., Proceedings of Spoken Language Systems Workshop, pp. 276–280, Austin, Jan. 1995.

Statistical Source Channel Models for Natural Language Understanding, Mark E. Epstein, Ph.D. Thesis, New York University, Sep. 1996.

The Application of Semantic Classification Trees to Natural Language Understanding, Kuhn t al., IEEE Transactions on Pattern Analysis and Machine Intelligence, pp. 449–460, vol. 17, No. 5, May 1995.

The Mathematics of Statistical Machine Translation: Parameter Estimation, Brown et al., Association for Computational Linguistics, pp. 263–311, vol. 19, No. 2, Jun. 1993.

Chronus, The Next Generation, Levin et al., Speech Research Department, AT&T Bell Laboratories, pp. 269–271.

*Primary Examiner*—Forester W. Isen
*Assistant Examiner*—Patrick N. Edouard
*Attorney, Agent, or Firm*—F. Chau & Associates, LLP

[57] ABSTRACT

A system for translating a first word set in a source language into a second word set in a target language, the system comprising: input means for inputting the first word set into the system; tagging means for tagging the first word set input to the system so as to at least substantially reduce non-essential variability in the first word set; translation means including a single a posteriori conditional probability model and a target candidate store for storing target language candidate word sets, wherein the translation means employs the single model to evaluate the target language candidate word sets in order to select the target language candidate word set having a best score with respect to the first word set; and output means for outputting the best scoring target language candidate word set as the second word set in the target language.

27 Claims, 2 Drawing Sheets

5,991,710

STATISTICAL TRANSLATION SYSTEM WITH FEATURES BASED ON PHRASES OR GROUPS OF WORDS

The U.S. Government has a paid-up license in this invention and the right in limited circumstances to require the patent owner to license others on reasonable terms as provided for by the terms of Contract No. N00014-92-C-0189 awarded by the Office of Naval Research.

BACKGROUND OF THE INVENTION

This invention relates to translation systems for translating a source language, e.g., natural language, into a target language, e.g., artificial language, and more particularly, the invention relates to such translation systems employing statistical methods.

It is known that statistical translation models were first introduced by P. F. Brown et al. in the article entitled: "The Mathematics of Statistical Machine Translation; Parameter Estimation," Computational Linguistics, 19(2), pp. 263–311 (June 1993). Such models were created in the context of French to English translation and were based on a source-channel paradigm. The source-channel paradigm uses two component models. The first model is known as the channel model and is defined as the probability of occurrence of a source language sentence S given a target language sentence T, that is, the conditional probability of the occurrence of S, given T, i.e., $P(S|T)$. The second model is known as the language (or source) model and is defined as the probability of occurrence of T, i.e., $P(T)$. The two component models are then used to compute the probability of the occurrence of T, given S, i.e., $P(T|S)$, via the relationship $P(T|S)=P(S|T)\cdot P(T)/P(S)$. The target language sentence T which maximizes the product $P(S|T)\cdot P(T)$ is chosen as the translation of the input source language sentence S. The channel model can also be thought of as a translation model, but, with the translation being performed from target to source. Each of the component models are estimated independently.

It is also known that such a priori models, as described above, may be used in the context of natural language translation as disclosed in U.S. Pat. No. 5,510,981 to Berger et al. issued on Apr. 23, 1996, and more recently for understanding in both the paper by M. Epstein entitled "Statistical Source Channel Models for Natural Language Understanding," Ph. D. Thesis, New York University (September 1996) and in a related patent application identified by U.S. Ser. No. 08/593,032.

However, given a source sentence S, for example, in a natural language such as English, it would be advantageous to be able to translate such sentence into a target language sentence T, for example, in an artificial (formal) language such as a database query language, utilizing a translation system employing a single statistical translation model. It would further be advantageous if said system were generally data-driven, built automatically from training data, and did not use domain-specific rules developed by experts so that it could be easily ported to new domains.

SUMMARY OF THE INVENTION

The present invention provides a method and system for performing statistical translation which employs a single model which is defined as the conditional probability of the occurrence of T, given the occurrence of S, i.e., $P(T|S)$. Furthermore, the present invention provide a method and system which uses feature functions that capture translation effects and language model effects in a unified framework, the selection of features being fully data-driven.

Such an inventive translation model disclosed herein is significantly more powerful than known models in that such a model developed in accordance with the present invention can handle a variety of features involving phrases, words, parses, and long-distance relations in both the source and target sentences. It is to be understood that neither explicit manual labeling of important words, nor explicit intrasentence segmentation of the training data, nor rule-based transformations are required by the present invention, unlike the methods and systems disclosed in the prior art, for example, the publication by E. Levin et al. entitled: "Chronus, The Next Generation," and the publication by S. Miller et al. entitled: "Recent Progress in Hidden Understanding Models," both publications appearing in Proceedings of Spoken Language Systems Workshop, pp. 269–271, Austin (January 1995). Furthermore, the approach of the present invention may be distinguished from the decision-tree based approach for language understanding disclosed in the article by R. Kuhn et al. entitled: "The Application of Semantic Classification Trees to Natural Language Understanding," IEEE Trans. Pattern Analysis and Machine Intelligence, 17 (5), pp. 449–460 (May 1995).

In one aspect of the present invention a system for translating a first word set (e.g., sentence) in a source language into a second word set (e.g., sentence) in a target language comprises: input means for inputting the first word set into the system; tagging means for tagging the first word set input to the system so as to at least substantially reduce non-essential variability in the first word set; translation means including a single a posteriori conditional probability model and a target candidate store for storing target language candidate word sets, wherein the translation means employs the single model to evaluate the target language candidate word sets in order to select the target language candidate word set having a best score with respect to the first word set; and output means for outputting the best scoring target language candidate word set as the second word set in the target language.

DETAILED DESCRIPTION OF PREFERRED EMBODIMENTS

Figure 1:
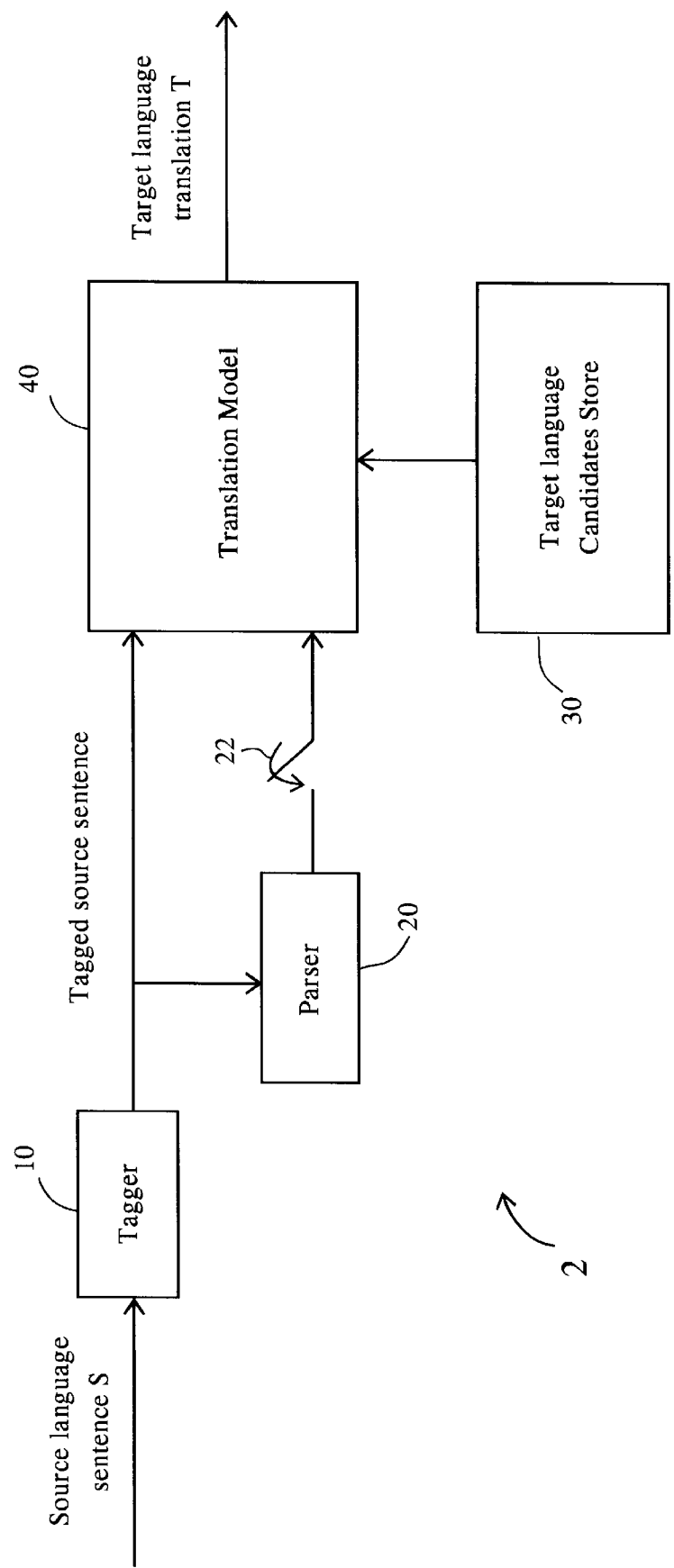
FIG. 1 is a block diagram of one embodiment of a translation system according to the present invention.

It should be understood that a preferred embodiment of the present invention will be explained in terms of a natural language understanding system, particularly, in the Air Travel Information System (ATIS) domain. However, the invention is in no way limited to ATIS applications. For that matter, neither is the invention limited to language understanding applications. Rather, the methods and systems described herein are broadly applicable to translation from any one language into any other language provided that the domain of application is substantially restricted. For example, other restricted domain applications for which the present invention may be employed include travel, tourism and public health applications. Those skilled in the art will recognize that the invention may be applied to various other domains.

It is to be appreciated that the teachings of the present invention disclosed herein may be implemented in hardware, software, or a combination thereof. Preferably, the translation system is implemented in software and run on an appropriately programmed general purpose computer. Such computer may also be the computer on which the application domain (e.g., ATIS) is being implemented; however, this is not critical to the invention, just as the particular application domain is not critical to the invention. Nonetheless, even if separate computers are employed to implement the present invention in the context of an ATIS domain, conventional data links for communicating between computers may be provided. One of ordinary skill in the art will appreciate such data communication methods and, thus, a further discussion thereof is not provided.

The computer system which is used to implement the translation system of the invention preferably includes input means for permitting a system user to input a natural language (source) sentence. This may include, but is not limited to; a speech recognition system for converting spoken words into computer recognizable text words; a keyboard for directly inputting text words or a digital tablet or scanner for converting handwritten text into computer recognizable text words. Once input to the translation system, the natural language sentence is then translated into an artificial (target) language sentence, as will be described below. The artificial or formal language may typically express the operations that one can perform on an application such as, for example, a word processor, an e-mail manager, or a database. In an ATIS application, the artificial language is a computer database query language. The artificial language query is then provided to the ATIS system, itself, where a reply is formulated and provided to the user via conventional data output devices, i.e., display, audio speaker, printer, etc. Again, the particular data input/output means are not critical to the invention.

Accordingly, the translation system of the invention will be described below such that the implementation of the translation model within the inventive translation system will be explained first followed by an explanation of the construction of the translation model of the invention and an exemplary method of implementing the model.

Referring now to FIG. 1, a block diagram of one form of a translation system according to the present invention is shown. The translation system 2 includes a tagger 10, a parser 20, a target language candidate store 30 and a translation model 40.

Specifically, the tagger 10 is responsive to the source language sentence, which is the sentence to be translated, input to the system. The tagger 10 is operatively coupled to the parser 20 and the translation model 40. The parser 20 and the target language candidate store 30 are also operatively coupled to the translation model 40. As explained above, the source language sentence, may be input to the system by conventional input means (not shown).

It should be understood that the present invention predominantly concerns itself with the translation model 40. As a result, the respective functions associated with the tagger 10 and the parser 30 may be performed by conventional units and are not critical to the invention. In fact, the parser 30, itself, is an optional component of the system and, therefore, may be omitted if so desired.

Specifically, the function of a tagger, such as tagger 10, is to reduce the non-essential variability associated with the source sentence which is input to the system. An example of tagging in an ATIS application would be as follows:

(1) UNTAGGED ENGLISH: I want to go from Boston to Denver on a Monday leaving before 2 pm.
(2) TAGGED ENGLISH: I want to go from city-1 to city-2 on a day-1 leaving before time-1. Sentence (1) would be input to the tagger 10 and sentence (2) would responsively be output therefrom. It is to be understood that the tagging process serves to tag the non-essential information portions of the sentence and thereby reduce translation variability caused by non-essential information portions of the sentence. Thus, the terms "Boston", "Denver", "Monday", and "2 pm" are deemed non-essential from the viewpoint of the translation system and, therefore, respectively tagged as "city-1", "city-2", "day-1" and "time-1". It should be noted that translating sentence (1) would be similar to translating the following sentence:

(3) UNTAGGED ENGLISH: I want to go from Chicago to Dallas on a Tuesday leaving before 3 pm. Thus, inputting sentence (3) into the tagger 10 would result in the same output from the tagger 10 that resulted from inputting sentence (1), i.e., sentence (2).

The function of the tagger 10 may be implemented in any known manner, for example, by a Hidden Markov Model (HMM) as disclosed in the publication by L. R. Bahl and R. Mercer entitled: "Part of Speech Assignment by a Statistical Decision Algorithm" IEEE International Symposium on Information Theory, pp. 88–89, Ronneby, Sweden (1976). Alternatively, the tagging function may be implemented by a decision tree as disclosed by E. Black et al. in the publication entitled: "Decision Tree Models Applied to the Labeling of Text with Parts-of-Speech", Proceedings of Speech and Natural Language Workshop pp. 117–121, New York (February 1992).

As mentioned, the translation system of the present invention may optionally include a parser 20 for providing a parsing function. The purpose of the parser is to extract structural information from the source language sentence. For instance, an example of parsing in an ATIS application would be as follows:

(4) TAGGED ENGLISH: I want to get into city-1 from city-2 on day-1 morning before time-1.

Given sentence (4), the parser 20 parses the sentence into subgroups of constituent words, labels the subgroups and identifies relations between the subgroups. As a result, sentence (4) may be parsed as follows:

(5) PARSED ENGLISH: [I want to] [get into city-1] [from city-2] [on day-1] [morning] [before time-1].

Then, the parser 20 may label the subgroups of constituent words. For instance, in the ATIS domain, subgroups of words may be labeled as follows: [I want to] may be labeled as "LIST", [get into city-1] may be labelled as "TO", and so on. Thus, if it is desired that the system 2 be so configured, the parser 20 may provide the parsing information to the translation model 40 wherein, along with the tagged sentence from the tagger 10, the source language sentence S is translated into target language sentence T. It is to be appreciated that switch 22 is provided in the path between the parser 20 and the translation model 40 so that the parsing function provided by unit 20 may be selectively enabled and disabled depending on the particular application associated with the translation system 2.

Focusing now on the translation model 40, it is to be appreciated that this inventive translation model of the present invention operates in conjunction with the target language candidate store 20. Specifically, the translation model consists of the following components: a prior model, a set of feature functions; and weights or weighting factors associated with the feature functions. In general, given a source language sentence S, the translation model evaluates target language sentences T as candidate translations of S. The candidate translation sentences are stored in target language candidate store 30. Thus, the translation model is effectively a scoring function defined as P(T|S). As will be explained, the scoring function (translation model) P(T|S) is evaluated by multiplying a prior score (prior model) $P_o$(T|S) by an exponential factor. The exponential factor is derived from a weighted sum (weights) associated with a finite set of feature functions evaluated on the pair (S,T). The target candidate which achieves the best score is chosen as the translation for S.

The features, which will be described below, may be thought of as each having a weight or weighting factor, also referred to as a vote, associated therewith. Given a source language sentence S and a target language sentence T, certain features are said to get to vote on the pair (S,T). These votes or weights modify the prior score multiplicatively. Some votes or weights are greater than a value of one and some are less than a value of one. The total score is determined by multiplying the prior score by the votes of all features that are true (or which "fire") on the pair (S,T) The candidate translations which do not cause a feature function to fire still result in multiplying of the prior score; however, the multiplying factor is one. If a search is performed over a finite set of candidate translations, P(T|S) can be optionally normalized across all such candidates. When normalized, P(T|S) is the conditional probability for T as a translation for S.

A description of the components of the translation model of the invention, i.e., the prior model, the feature functions and the weights, will now be provided.

First, it is to be understood the prior model $P_o$(T|S) may be simply supplied in a variety of manners. For instance, the prior model may arise from a decision network, another stochastic probabilistic model or may simply be uniform for all candidate translations.

Next, it is to be appreciated that one of the powerful aspects of the present invention is the variety of feature functions formed and supported thereby. Given such a variety of feature functions, it is a significant advantage that all such functions may be supported, particularly, within one framework. The feature functions of the invention are typically of the form:

$$\phi_{s,t}(S, T) = \begin{cases} 1; \text{if } s \text{ is in } S \text{ and } t \text{ is in } T \\ 0; \text{else.} \end{cases}$$

An example of the types of feature functions formed and supported by the present invention will now be illustrated within the context of the ATIS domain; however, the example is not exhaustive and, as previously mentioned, the invention is not limited to ATIS applications. The example provides some sample English (tagged) sentences, $E_1 \ldots E_6$, and some sample formal sentences, $F_1 \ldots F_5$. The formal sentences are not necessarily corresponding translations of the English sentences.

$E_1$: I want to go from city-1 to city-2 and I want to leave after time-1 on a day-1.
$E_2$: I want to go from city-1 to city-2 and I want to leave a little after time-1 on a day-1.
$E_3$: Show me AM flights leaving city-1 early day-1 morning.
$E_4$: Give me morning flights from city-1 that arrive in city-2 as early as possible.
$E_5$: What are the cheapest flights from city-1 to city-2.
$E_6$: What flights do you have from city-1 to city-2.
$F_1$: List flights departing after time-1 flying-on day-1 from-:city city-1 to:city city-2
$F_2$: List flights arriving after time-1 arriving-on day-1 from-:city city-1 to:city city-2
$F_3$: List flights early-morning flying-on day-1 from:city city-1
$F_4$: List flights morning earliest-arriving from:city city-1 to:city city-2
$F_5$: List flights cheapest from:city city-1 to:city city-2

Phrase Features

Phrase feature functions formed and supported by the translation model are defined such that s and t are phrases (n-grams) whereby s∈S is interpreted as representing the phrase s occurring within the source language sentence S and t∈T is interpreted as representing the phrase t occurring within target language sentence T. An example of a phrase feature function operation performed by the model is one that looks for the existence of a 1-word phrase, such as "day-1" in the English (tagged) sentence, and a corresponding 2-word phrase, such as "flying-on day-1" in the formal sentence (stored in target language candidate store 30). In other words, the translation model performs a comparison between the English sentence and all target candidate sentences (stored in storage unit 30) to determine which feature functions fire (or are true, or take on the binary value of one) on the pair (S,T). Thus, a phrase feature fires, for example, on ($E_2$, $F_1$) but not, for example, on ($E_1$, $F_2$). It is to be appreciated that the number of words in the English phrase (e.g., 1-word phrase) may be different from the number of words in the formal phrase (e.g., two words). Another example of a phrase feature function would be the operation whereby the model searches for and the formal phrase "departing after time-1" given the English phrase "leave after time-1". It is to be understood that this feature fires, for example, on ($E_1$, $F_1$), but not, for example, on ($E_1$, $F_2$) or ($E_2$, $F_1$)

Word-set Features

Word-set feature functions formed and supported by the translation model of the present invention are characterized such that s and t are unordered sets of words. That is, s is in S if all n words of s are in S, regardless of the order in which they occur in S. Likewise, t is in T if all n words of t are in T, regardless of the order in which they occur in T. An example of a word-set feature function or operation performed by the model in the ATIS domain would be searching for the existence of the unordered words "departing" and "after" among the formal sentence candidates (stored in target language candidate store 30), given an English sentence having the unordered words "leave" and "after" contained therein. For instance given the sample English sentences ($E_1$ through $E_6$) and the sample formal sentences ($F_1$ through $F_5$) above, the word-set feature function fires on $E_1$ and $F_1$, thus, identifying the pair ($E_1$, $F_1$). The same is true for the pair ($E_2$, $F_1$)

Long Distance Bigram Features

Long distance bigram feature functions formed and supported by the translation model of the invention are characterized by a correspondence between $s_1$ k $s_2$ and t. It is to be understood that $s_1$ k $s_2$ is interpreted to refer to a first word, $s_1$, and a second word, $s_2$, separated by a maximum of k words within sentence S. So, the restrictions are that, at most, k words may separate $s_1$ and $s_2$, and $s_2$ must follow $s_1$. Thus, the long distance bigram feature function includes a search of the target sentence candidates looking for a particular occurrence of t given a particular occurrence of $s_1$ k $s_2$. For instance, given $E_1$ through $E_6$ and $F_1$ through $F_5$, the long distance bigram feature looks for the word "early" followed immediately after, or k words after, by the word "morning" in the English sentence and the single word "early-morning" in the formal sentence. Thus, the long distance bigram feature searching for "early 2 morning" ($s_1$ k $s_2$) and "early-morning" (t) fires on ($E_3$, $F_3$) but not, for example, on ($E_4$, $F_3$).

Language Model Features

In the application of a language model feature function formed and supported by the invention, the feature substantially ignores the source sentence completely and searches for phrases, word-sets or long distance bigrams ($t_1$ k $t_2$) among the target sentence candidates. Such features capture the target language model effect and obviate explicitly modeling P(T), as is done in the source-channel model approach previously discussed. An example of this type of feature function is an operation which looks for the word "earliest-arriving" in the formal sentences. Such feature fires on ($E_1$, $F_4$), ($E_2$, $F_4$), ($E_3$, $F_4$) and ($E_4$, $F_4$) but not on (E, $F_3$) for any E. In an ATIS application, it is clear that people ask queries whose translation is :

(6) List flights from:city city-1 to:city city-2 more frequently than queries whose translation is (7) Extract all wingspan features in aircraft equipping flights flying-on day-1 arriving at time-1 from:city city-1 to:city city-2.

Therefore, without even looking at a specific English query, one could see that sentence (6) is more likely to be the translation than sentence (7). This is what language model features are designed to capture. A language model feature therefore ignores the English query completely.

Spurious Target Insertion Features

This type of a feature formed and supported by the invention looks for the existence of words in the target sentence that do not have an "informant" in the source sentence. An example feature is one that looks for the word "cheapest" in the formal candidates in the absence of words such as "lowest" and/or "cheapest" in the English sentence. The feature fires on ($E_6$, $F_5$) but not on ($E_5$, $F_5$). Such features are expected to have multiplicative weights less than 1. In other words, the word "cheapest" is not going to be part of the target sentence if there is no evidence (i.e., informant) of such word in the source sentence. Thus, any target candidate not having evidence of the subject word or phrase is penalized or given a smaller weight, as will be explained below.

Spurious Target Deletion Features

This type of feature formed and supported by the invention looks for the absence of words in the target sentence that ought to explain "informants" in the source sentence. An example feature is one that fires if the word "cheapest" is absent in the formal sentence, while words such as "lowest", "cheapest" and/or "least expensive" are present in the English sentence. This feature fires on ($E_5$, $F_4$) but not on ($E_5$, $F_5$). Such features are expected to have multiplicative weights less than 1, that is, such target candidates are penalized, as mentioned above and as will be explained below.

Features Based on Analysis

Features can be based on analysis of source and target sentences. Analysis may include parsing, but is not limited thereto. Parsing, as previously explained, provides valuable information on natural language sentences. The structural analysis provided by a parser can be easily exploited by the scheme of the invention. Consider the following English (tagged) sentence.

$E_7$: I want to get into city-1 from city-2 on day-1 morning before time-1.

After parsing, we can transform it into:

$E'_7$: I want to get into to-city-1 from from-city-2 on arrival-day-1 morning before arrival-time-1.

In this example, the statistical parser determines that "time-1" is an arrival time rather than a departure time. This analysis can be incorporated into the translation model by means of feature functions on analyzed source and target sentences. An example feature is one that looks for "before arrival-time-1" in the English sentence and "arriving before time-1" in the formal sentence. The model of the present invention has the ability to use parsed and unparsed sentences simultaneously.

It is to be appreciated that the feature functions of the present invention, as described above, need not be binary-valued; rather, they can be real-valued. As will now be explained, each feature function has a weight associated therewith.

The weights of feature functions can be, but need not be, chosen by maximizing a likelihood associated with training data, or by maximizing other objective functions. We can now describe how to select the weights associated with each feature function.

Given a set of features represented as $\{\phi_1, \phi_2, \ldots, \phi_n\}$ we need to select a set of parameters represented as $\{\lambda_1, \lambda_2, \ldots, \lambda_n\}$. Selecting these parameters is called "training". Training is a one-time process performed to create the translation model, which will be used subsequently for translation. Let $\lambda := [\lambda_1\ \lambda_2, \ldots \lambda_n]$ and let $$\phi := \begin{bmatrix} \phi_1 \\ \phi_2 \\ \vdots \\ \phi_n \end{bmatrix}.$$

Training data, which consists of matched pairs ($s_i$, $T_i$), where i=1,2, . . . ,N, determines the parameters. Several novel schemes for selecting the parameter vector $\lambda$ are described below. With every $\lambda$ is associated a model represented as:

$$P_{\lambda,\phi}(T \mid S) := \frac{P_o(T \mid S) e^{\sum_{i=1}^{n} \lambda_i \phi_i(S,T)}}{Z(S)}$$

where Z(S) is a normalization factor, to be described below. Let $\hat{T}_i$ be the model's translation of $s_i$, which may or may not be the same as the true translation $T_i$. That is, $$\hat{T}_i := \max_T P_{\lambda,\phi}(T \mid S_i)$$

Then, the first scheme for selecting the parameter vector $\lambda$ is to select $\lambda$ such that $$D_1(\lambda) := \sum_{i=1}^{N} \frac{P_{\lambda,\phi}(T_i \mid S_i)}{P_{\lambda,\phi}(\hat{T}_i \mid S_i)}.$$

where $D_1(\lambda)$ is an objective function. Thus, given this first scheme, a measure of the model's predictive power is maximized. That is, $\lambda$ is chosen to maximize $D_1(\lambda)$.

Similarly, let $I_i$ be an imposter for $s_i$. That is, let $$I_i := \max_{T \neq T_i} P_{\lambda,\phi}(T \mid S_i).$$

Thus, the second scheme for selecting the parameter vector is to select $\lambda$ such that $$D_2(\lambda) := \sum_{i=1}^{N} \frac{P_{\lambda,\phi}(T_i \mid S_i)}{P_{\lambda,\phi}(I_i \mid S_i)}.$$

where $D_2(\lambda)$ is an objective function. Thus, given this second scheme, a measure of model's discriminative power is maximized. That is, $\lambda$ is chosen to maximize $D_2(\lambda)$.

Yet a third method is to select $\lambda$ that maximizes the conditional maximum entropy of the model. It is to be appreciated that all of these problems result in convex optimization problems in the n-dimensional Euclidean space $R^n$. Another novel approach is to use a combination of the three methods described above to estimate the parameters. Thus once we have the prior model, a set of features and weights associated with them, as described above, we have a translation model that is described more precisely as below.

Suppose we have n features and that $\lambda_i$ is the weight associated with feature $\phi_i$, where i=1,2, ..., n. We want to translate a source language sentence S. Then, we evaluate the score of the candidate T as a translation of S as below:

$$P(T \mid S) := \frac{P_o(T \mid S) e^{\sum_{i=1}^{n} \lambda_i \phi_i(S,T)}}{Z(S)}$$

where the normalization factor $Z(S)$ is given by:

$$Z(S) := \sum_T P_o(T \mid S) e^{\sum_{i=1}^{n} \lambda_i \phi_i(S,T)}$$

By defining $\alpha_i := e^{\lambda_i}$, we can rewrite the above as:

$$P(T \mid S) = \frac{P_o(T \mid S) \prod \alpha_i^{\phi_i(S,T)}}{Z(S)}.$$

In this manner, feature weights are seen to enter multiplicatively in the equation. Finally, we choose as the translation the target sentence T which maximizes P(T|S). For the purpose of maximizing T, we can ignore $Z(S)$ and evaluate P(T|S) directly from:

$$P_o(T \mid S) \prod \alpha_i^{\phi_i(S,T)}.$$

That is, we simply multiply the prior score $P_o(T|S)$ by the multiplicative weights, $\alpha_i$, of features that are true (fire) on the pair (S,T).

Above, a novel translation model built on a given set of features, their associated weights and a prior model has been described. In the following explanation, it is described how one can automatically select a set of interesting features from a large pool of candidate features. Again, this selection is done prior to using the translation model for actual translation. First, a candidate pool of features is created, as described above, such that each feature fires (that is, does not have a binary value of zero), at least a few times, on the training data. Features are selected much like the maximum entropy feature selection scheme as disclosed in the article by A. Berger et al. entitled: "A Maximum Entropy Approach to Natural Language Processing," Computational Linguistics, vol. 22, no. 1, pp. 39–71 (1996), but we can alternatively use a combination of the maximum entropy, $D_1$ and $D_2$ measures, described above, to rank features in the pool.

Figure 2:
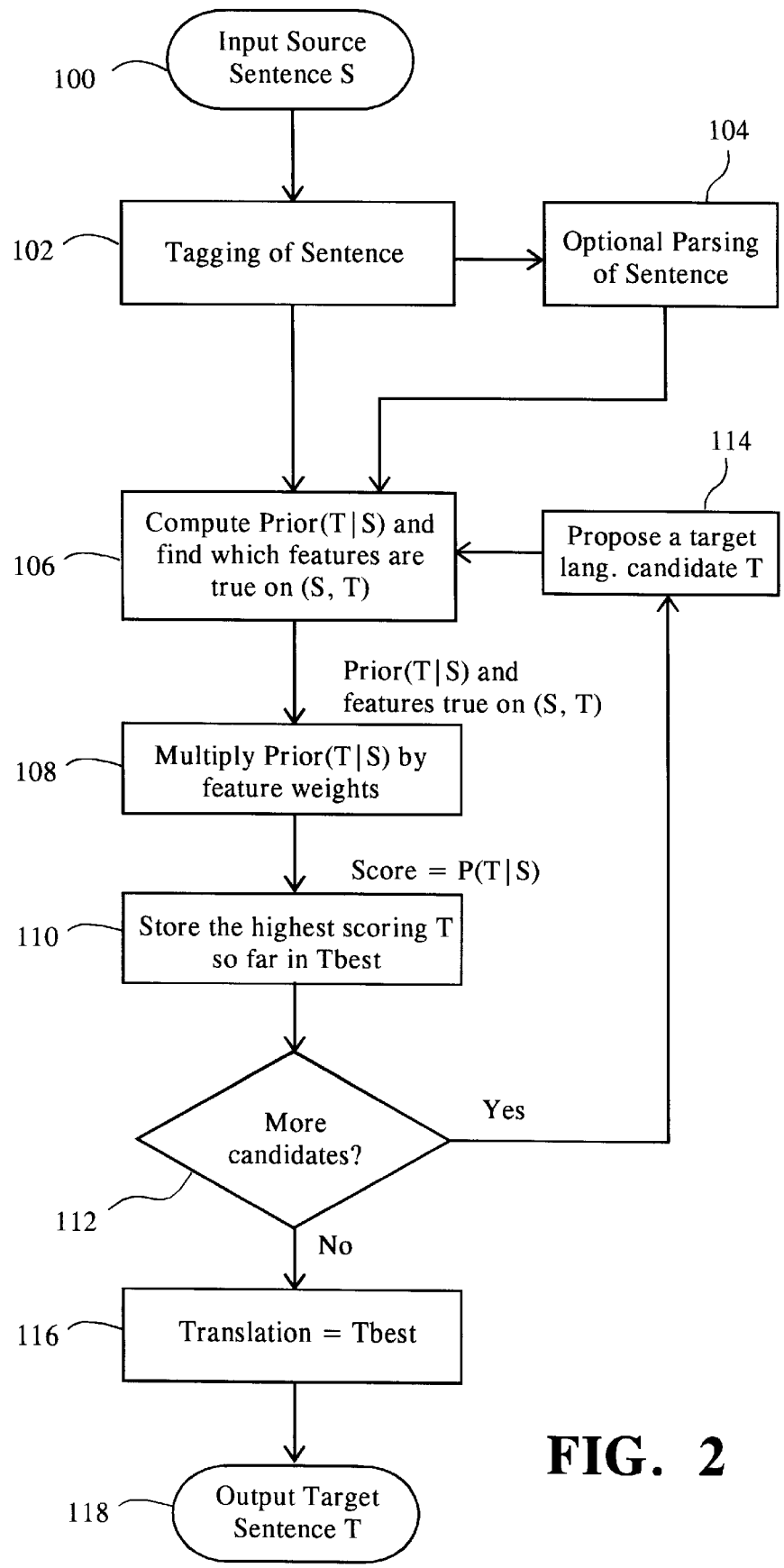
FIG. 2 is a flow chart illustrating one embodiment of the translation process according to the present invention.

Referring now to FIG. 2, a flow chart relating to a preferred translation procedure utilizing a translation model constructed in accordance with the present invention, as detailed above, is shown. In step 100, the source sentence S to be translated is input to the translation system of the invention. Again, this may be by any conventional data input means. Next, in step 102, the source sentence S is tagged in order to reduce the non-essential variability in the source sentence, as previously explained. Also, step 104 may be optionally performed, wherein the tagged source sentence is parsed in order to extract structural information from the tagged source sentence, as previously explained.

The tagged sentence from the tagging step and the structural information provided by the parsing step are utilized in step 106. In step 106, the prior model $P_o(T|S)$ is computed and the features (e.g., phrase features, word-set features, long-distance bigram features, language model features, spurious target-insertion features, spurious target-deletion features, features based on analysis) which are true on pair (S,T) are found. Next, $P_o(T|S)$ and the features found to be true on (S,T) are provided to step 108 whereby the prior model $P_o(T|S)$ is multiplied by the weights associated with each feature in order to generate a score referred to as P(T|S). Again, the target language candidates which do not cause a feature function to fire may have a multiplying factor of one associated therewith.

In step 110, the highest scoring T, or target sentence, is stored as $T_{best}$. It is then determined if there are more target candidates (step 112) to be evaluated and, if so, the translation procedure proposes the next target candidate T in step 114. Then, steps 106 through 110 are repeated for the next candidate such that the highest scoring T ($T_{best}$) is determined among the evaluated candidates. Again, in step 112, it is determined whether there are any more target candidates and, if not, it is determined that the target candidate having the highest score ($T_{best}$) is the resulting translated sentence for the source sentence input to the system (step 116). The chosen translation sentence is then output by the system in step 118.

Experimental Results

A translation system was constructed of the type disclosed herein. The training corpus size was 5627 matched pairs of sentences from ATIS-2 and ATIS-3 databases. These databases were provided by ARPA (Advanced Research Projects Agency) and consist of thousands of English sentences and their formal translations. A candidate pool of 130,000 features was built from which about 800 features were extracted automatically. About 290 of these features were trained using the $D_2$ measure and the rest using the maximum entropy framework. This model was used as the translation component of an English-SQL (Standard Query Language) system. The system was tested on context independent sentences of DEV94 (a development test set) and of DEC93 and DEC94 (evaluation test sets), all provided by ARPA. Translation performance is measured by Common Answer Specification, a metric defined by ARPA in terms of response from an air travel database. Significantly, we achieved approximately 85%, 86%, and 87% performance on DEV94, DEC94, DEC93, respectively. These experimental results are a substantial improvement over previous statistical translation systems.

What is claimed is:

1. A system for translating a first word set in a source language into a second word set in a target language, the system comprising:

input means for inputting the first word set into the system;

tagging means for tagging the first word set input to the system so as to at least substantially reduce non-essential variability in the first word set;

translation means including a single a posteriori conditional probability model and a target candidate store for storing target language candidate word sets, wherein the translation means employs the single model to evaluate the target language candidate word sets in order to select the target language candidate word set having a best score with respect to the first word set;

wherein the single model includes a prior model, a plurality of feature functions and a plurality of weighting factors respectively corresponding to the plurality of feature functions, wherein the translation means receives the first word set and, in accordance with the single model, iteratively proceeds through the target language candidate store and each of the candidate word sets and finds the feature functions which are true with respect to the first word set and the second word set, and then multiplies the prior model by the weighting factors corresponding to the feature functions thereby providing resulting scores, the translation means then choosing the best matching target language candidate word set in accordance with the resulting scores; and output means for out putting the best scoring target language candidate word set as the second word set in the target language.

2. The system of claim 1, wherein the prior model is one of a stochastic probabilistic model, a uniform model and a decision network based model.

3. The system of claim 1, wherein the plurality of feature functions includes a phrase feature function and wherein the phrase feature function is true when the first word set has a first phrase therein and at least one of the target language candidate word sets has a second phrase therein.

4. The system of claim 1, wherein the plurality of feature functions includes a word-set feature function and wherein the word-set feature function is true when the first word set has a first subset of unordered words therein and at least one of the target language candidate word sets has a second set of unordered words therein.

5. The system of claim 1, wherein the plurality of feature functions includes a long distance bigram feature function and wherein the bigram feature function is true when the first word set has a first word and a subsequent second word therein which are separated by no more than a predetermined number of words and at least one of the target language candidate word sets has a third word therein.

6. The system of claim 1, wherein the plurality of feature functions includes a language model feature function and wherein the language model feature function is true when at least one of the target language candidate word sets has at least one of a phrase, a set of unordered words, and a first word and a subsequent second word which are separated by no more than a predetermined number of words.

7. The system of claim 1, wherein the plurality of feature functions includes a spurious target-insertion feature function and wherein the spurious target-insertion feature function is true when the target language candidate word set has at least one word which has no correspondingly related word in the first word set.

8. The system of claim 1, wherein the plurality of feature functions includes a spurious target-deletion feature function and wherein the spurious target-deletion feature function is true when the first word set has at least one word which has no correspondingly related word in the target language candidate word set.

9. The system of claim 1, wherein the plurality of feature functions includes a feature function based on an analysis of the first word set and the target language candidate word set.

10. The system of claim 1, wherein the analysis performed by the feature function is a statistical parsing analysis.

11. The system of claim 1, wherein the plurality of weighting factors respectively corresponding to the plurality of feature functions are selected such that:

$$D_1(\lambda) := \sum_{i=i}^{N} \frac{P_{\lambda,\phi}(T_i \mid S_i)}{P_{\lambda,\phi}(\hat{T}_i \mid S_i)}$$

where $D_1(\lambda)$ is an objective function, $\lambda$ represents the plurality of weighting factors, $\phi$ represents the plurality of feature functions, $s_i$ represents the first word set, $T_i$ represents the second word set, and $\hat{T}i$ is defined such that, $$\hat{T}_i := \max_T P_{\lambda,\phi}(T \mid S_i),$$

wherein $\lambda$ is chosen to maximize $D_1(\lambda)$.

12. The system of claim 1, wherein the plurality of weighting factors respectively corresponding to the plurality of feature functions are selected such that:

$$D_1(\lambda) := \sum_{i=i}^{N} \frac{P_{\lambda,\phi}(T_i \mid S_i)}{P_{\lambda,\phi}(\hat{T}_i \mid S_i)}$$

where $D_2(\lambda)$ is an objective function, $\lambda$ represents the plurality of weighting factors, $\phi$ represents the plurality of feature functions, $s_i$ represents the first word set, $T_i$ represents the second word set, and $I_i$ is defined such that $$I_i := \max_{T \neq T_i} P_{\lambda,\phi}(T/S_i).$$

wherein $\lambda$ is chosen to maximize $D_2(\lambda)$.

13. The system of claim 1, wherein the plurality of weighting factors respectively corresponding to the plurality of feature functions are selected such that the plurality of weighting factors maximizes a conditional maximum entropy of the single a posteriori conditional probabilistic model.

14. The system of claim 1, wherein the input means includes means for receiving a spoken word set in the source language and converting the spoken word set into the first word set.

15. The system of claim 1, wherein the input means includes means for receiving a handwritten word set in the source language and converting the handwritten word set into the first word set.

16. The system of claim 1, wherein the input means includes means for receiving a typed word set in the source language and utilizing the typed word set as the first word set.

17. The system of claim 1, wherein the tagging means includes one of a Hidden Markov Model tagger and a decision tree based tagger.

18. The system of claim 1, wherein the source language is a natural language.

19. The system of claim 18, wherein the natural language is English.

20. The system of claim 1, wherein the target language is an artificial language.

21. The system of claim 1, wherein the target language is a natural language which is substantially domain-restricted.

22. The system of claim 20, wherein the artificial language is a computer database query language.

23. The system of claim 22, wherein the computer database query language is adapted to an air travel information system domain.

24. The system according to claim 1, further including parsing means responsive to the tagging means for parsing the tagged first word set so as to at least extract structural information from the tagged first word set, the structural information being employed by the translation means.

25. The system of claim 15, wherein the parsing means includes one of a statistical decision tree based parser and a maximum entropy parser.

26. A method for translating a first word set in a source language into a second word set in a target language, the method comprising the steps of:

(a) storing target language candidate word sets;

(b) forming a single a posteriori conditional probability model which includes a prior model, a plurality of feature functions and a plurality of weighting factors respectively corresponding to the plurality of feature functions;

(c) inputting the first word set;

(d) tagging the input first word set so as to at least substantially reduce non-essential variability in the first word set;

(e) determining which features fire regarding the target language candidate word sets and if at least one of the feature functions fires, multiplying the prior model by the weighting factor corresponding to the feature function to provide a resulting score, and if no feature function fires than multiplying the prior model by one;

(f) evaluating a next target language candidate word set, if available, as in step (e); and (g) determining a best score from among the resulting scores such that the target language candidate word set having the best score is chosen as the second word set in the target language.

27. A translation model utilized in a translation system for translating a first word set in a source language into a second word set in a target language, the translation model comprising a prior model, a plurality of feature functions and a plurality of weighting factors respectively corresponding to the plurality of feature functions, wherein the translation model is responsive to the first word set and iteratively proceeds through a target language candidate store of candidate word sets and each of the candidate word sets and finds the feature functions which are true with respect to the first word set and the second word set, and then multiplies the prior model by the weighting factors corresponding to the feature functions thereby providing resulting scores, the translation model then providing the best scoring target language candidate word set in accordance with the resulting scores.

* * * * *